United States Patent
Werback

(10) Patent No.: US 7,349,774 B2
(45) Date of Patent: Mar. 25, 2008

(54) AIRCRAFT TRAFFIC WARNING SYSTEM USING AN AD-HOC RADIO NETWORK

(75) Inventor: Andrew R. Werback, San Jose, CA (US)

(73) Assignee: Symbol Technologies, Inc., Holtsville, NY (US)

(\*) Notice: Subject to any disclaimer, the term of this patent is extended or adjusted under 35 U.S.C. 154(b) by 0 days.

(21) Appl. No.: 11/691,342

(22) Filed: Mar. 26, 2007

(65) Prior Publication Data
US 2007/0198142 A1  Aug. 23, 2007

Related U.S. Application Data

(62) Division of application No. 11/044,909, filed on Jan. 26, 2005, now Pat. No. 7,212,918.

(51) Int. Cl.
*G01C 23/00* (2006.01)
*G01S 13/04* (2006.01)

(52) U.S. Cl. .............. 701/3; 701/301; 342/29

(58) Field of Classification Search ............ 701/3, 701/14–16, 120, 122, 300–302; 342/29, 342/30, 36, 42–46; 340/945, 961
See application file for complete search history.

(56) References Cited

U.S. PATENT DOCUMENTS

| 6,097,315 | A  |   | 8/2000 | Minter et al. |        |
|-----------|----|---|--------|---------------|--------|
| 7,006,032 | B2 | * | 2/2006 | King et al.   | 342/29 |
| 2002/0059420 | A1 |   | 5/2002 | Ching-Fang et al. | |
| 2003/0097216 | A1 |   | 5/2003 | Etnyre |  |
| 2003/0122701 | A1 |   | 7/2003 | Tran |  |
| 2004/0174295 | A1 |   | 9/2004 | Stayton et al. |  |

FOREIGN PATENT DOCUMENTS

WO PCT/US2005/041063   5/2006

OTHER PUBLICATIONS

Ryan A. et al, "An Overview of Emerging Results in Cooperative UAV Control", Decision and Control, 2004. CDC. 43rd IEEE Conference on Nassau, Bahamas Dec. 14-17, 2004.

\* cited by examiner

*Primary Examiner*—Yonel Beaulieu
(74) *Attorney, Agent, or Firm*—Ingrassia Fisher & Lorenz, P.C.

(57) ABSTRACT

Methods and apparatus are provided for a traffic warning system (TWS) for light aircraft. The TWS comprises a processor coupled to a transceiver, adapted to measure signal strength and send/receive messages containing station ID and preferably altitude and position data. Memory, display and various flight data instruments, such as GPS, altimeter, etc., are also coupled to the processor. The transceiver-processor automatically identifies TWS equipped aircraft within range using an ad-hoc network and exchanges ID and position information. The processor determines range from signal strength and/or received position information and, given enough data, determines direction, altitude, speed, etc., of the other aircraft, which it presents to the pilot. These values and their rate of change are compared to stored alarm thresholds, and the pilot is warned when another aircraft triggers the threshold. Evasive action is recommended where possible.

11 Claims, 5 Drawing Sheets

AIRCRAFT TRAFFIC WARNING SYSTEM USING AN AD-HOC RADIO NETWORK

CROSS REFERENCE TO RELATED APPLICATION

This application is a divisional application of prior application Ser. No. 11/044,909 filed Jan. 26, 2005, now U.S. Pat. No. 7,212,918.

TECHNICAL FIELD

The present invention generally relates to traffic monitoring, and more particularly to a traffic warning system and method for use in aircraft.

BACKGROUND

Traffic warning systems for aircraft are well known in the art. Such systems are intended to identify and track other aircraft in the vicinity of a particular plane and warn the pilot of those approaching or hovering aircraft that may present a hazard because of their flight vector, altitude or other factors. Such systems are important for flight safety. They may be entirely contained within the aircraft or rely on a combination of airborne and surface based systems. Either arrangement is useful. Most large commercial aircraft and military aircraft are already equipped with such traffic warning systems. These systems often rely on air traffic control (ATC) radar signals, which are not always available, or on simple transponder signals that convey little information.

The most significant limitation of such prior art traffic warning systems is their size and cost which, in general, makes them unsuitable or economically unattractive for use in relatively small private or commercial aircraft, light helicopters, ultra-light aircraft, pilot-less aircraft or drones, and other airborne platforms of limited size and cost (hereafter collectively "light aircraft"). Accordingly, a need continues to exist for a traffic warning system and method that is simple, compact and of low cost, for use in such light aircraft.

It is desirable to provide a traffic warning system and method that is especially suited for use in light aircraft, that is low in cost compared to prior art systems, and that makes substantial use of standard off-the-shelf components and communication protocols, as well as instruments that many light aircraft already carry. In addition, it is desirable that the traffic warning system and method be simple, rugged and capable of operating in different modes depending upon the avionics capabilities of aircraft in its vicinity. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for a traffic warning system (TWS) for light aircraft. The TWS apparatus comprises a processor coupled to a transceiver, adapted to measure signal strength and send and receive messages containing station ID and preferably altitude and position data. Memory, display and various flight data instruments, such as GPS, altimeter, and others, are also coupled to the processor. The transceiver-processor automatically identifies similar TWS equipped aircraft within radio communication range as an ad-hoc network and exchanges ID and position related information. The processor determines range from signal strength and/or received position information and, given enough data, determines direction, altitude, speed, etc., of the other aircraft, which it presents to the pilot. These values and their rate of change are compared to stored alarm thresholds, and the pilot is warned when another aircraft triggers the threshold. Evasive action is recommended where possible.

A method is provided for tracking aircraft using an airborne traffic warning system (TWS) having inter-coupled transceiver, processor, memory, annunciator and flight status instruments. The method comprises receiving ID and positional information signals from aircraft within communication range, updating a roster of aircraft retained in memory from previous receiving steps, determining proximity of each of the aircraft, and presenting the proximity information to the user via the annunciator. In a preferred embodiment the method further comprises prior to the receiving step, sending an interrogation signal to the aircraft. The proximity of each of the aircraft may be determined from the location information in the received signals or from the strength of the received signals or both. The receiving, updating, determining and presenting steps are periodically or randomly repeated so that the roster and proximity of the aircraft are constantly being updated.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
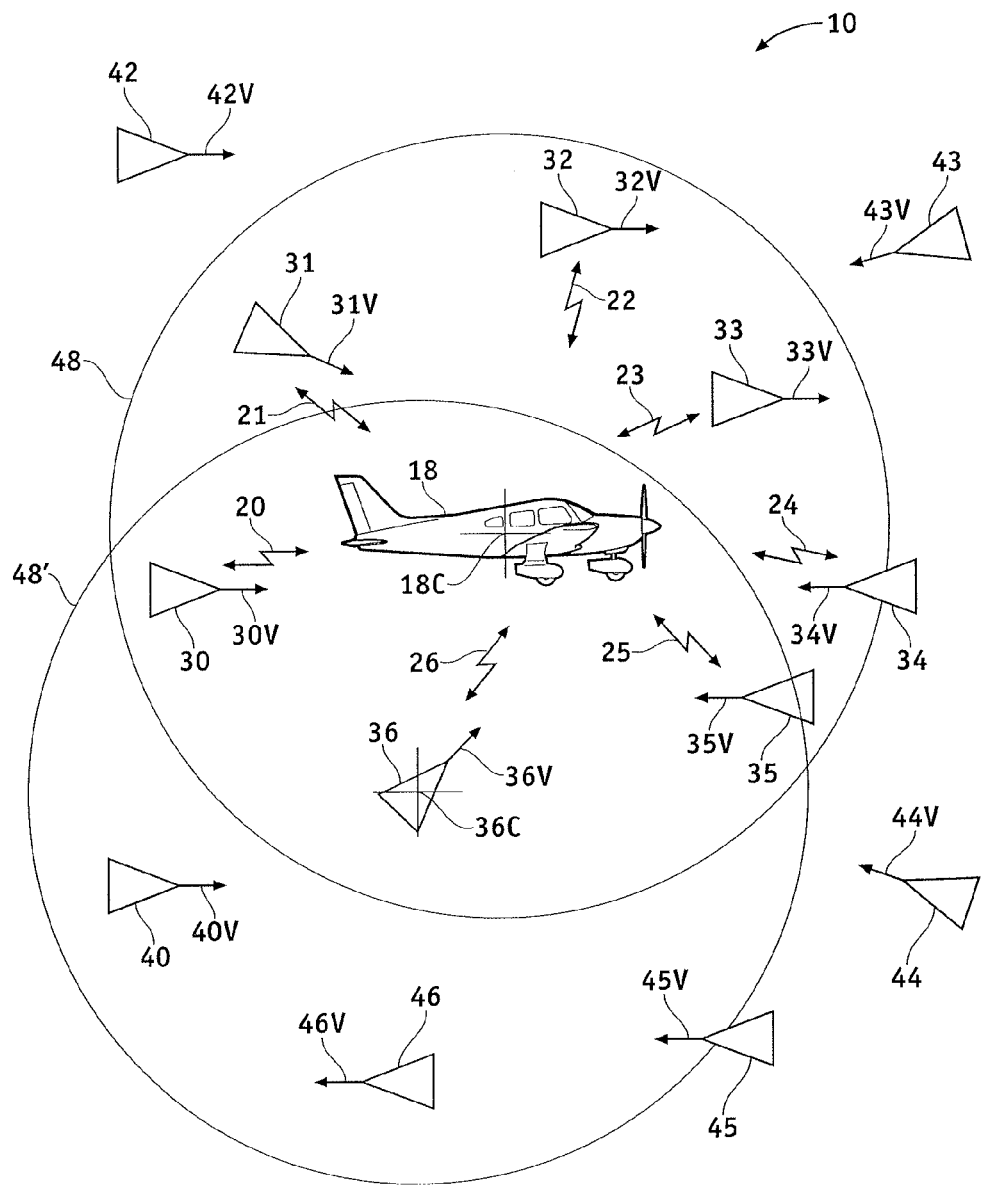
FIG. 1 is a simplified view of the a group of light aircraft in flight, wherein a portion thereof are intercommunicating according to the present invention.

FIG. 1 is a simplified view of group 10 of light aircraft 18, 30-36 and 40-46 in flight at a particular moment in time, wherein a portion (e.g., aircraft 18 and aircraft 30-36) are intercommunicating according to the present invention, as indicated by signals 20-26. For convenience of explanation it is assumed that aircraft 18 is the aircraft in which the traffic warning system and method of the present invention is operating to alert the pilot thereof of any potential hazards that may be presented by the other aircraft. However, those of skill in the art will understand based on the description herein that similar systems may be operating in whole or in part in the other aircraft as well. For convenience of illustration, aircraft 30-36 and 40-46 are represented by simple triangles. Vectors 18V, 30V-36V and 40V-46V indicate the current flight paths of aircraft 18, 30-36 and 40-46 respectively. Vectors 18V, 30V-36V and 40V-46V may have any direction in three-dimensional space and are not limited merely to the directions shown in FIG. 1.

Boundary 48 associated with aircraft 18 represents the three-dimensional contour within which aircraft using the traffic warning system of the present invention can intercommunicate with aircraft 18 for purposes of traffic warning. While boundary 48 is shown as being spherical and centered on aircraft 18 as indicated by center 18C, this is merely for convenience of explanation and persons of skill in the art will understand that boundary 48 may have a more complex shape. As used herein in connection with boundary 48 and analogous contours, the word "sphere" and "spherical" are intended to also refer to such more complex shapes. Boundary 48 moves with aircraft 18. At the particular point in time shown in FIG. 1, aircraft 18 and 30-33 and 35-36 are currently inter-communicating for traffic warning purposes while aircraft 40-46 are outside boundary 48 within which the traffic warning system of the present invention operates directly. Aircraft 34 is just entering boundary 48 and beginning to communicate with aircraft 18 as shown by signal 24. Thus, as time progresses, various aircraft will enter and exit boundary 48. The system and method of the present invention continually updates one or more communication and flight parameters (e.g., unique ID, signal strength, altitude, position, direction, speed, etc.) of the aircraft within boundary 48, dropping those aircraft that leave boundary 48 and adding those aircraft that enter boundary 48, so as to continually assess the likelihood that any aircraft within boundary 48 might present a hazard to aircraft 18 and so warn the pilot. While the present invention is particularly well suited for use with light aircraft, it will be understood that aircraft 18, 30-36 and 40-46 may be any type of aircraft, that any number of aircraft may be involved and that the present invention is not limited merely to the number and flight directions of the particular aircraft shown in FIG. 1. Boundary 48' is an analogous spherical boundary associated by way of example with aircraft 36, as indicated by center 36C.

It is desirable that boundary 48 have a radius large enough so that the traffic warning system of the present invention has time to detect an approaching aircraft and display warning information, and the pilot or other crew member have sufficient reaction time to take evasive action. At least thirty seconds warning time is desirable with longer warning times (e.g., ≧about sixty seconds) being preferred. For example, typical light aircraft rarely have speeds in excess of about 100-300 miles (160-480 kilometers) per hour, giving a maximum expected closing speed of about 600 miles (960 kilometers) per hour. Thus, a five-mile (eight-kilometer) boundary radius provides about thirty seconds warning time under worse case conditions for typical light aircraft maximum closing speeds, and significantly longer reaction times for lower closing speeds (e.g., about ninety seconds for a 200 mile (320 kilometer) per hour closing speed). While smaller boundary radii are useful (e.g., about three miles (five kilometers)), it is desirable that the radius of boundary 48 be at least about five miles (eight kilometers) and preferably about ten miles (sixteen kilometers) or more.

The radius of boundary 48 is determined by the radio traffic warning system transceivers and associated antennas mounted on the aircraft. A preferred antenna shape would be a pancake type antenna, e.g., a cylinder with a diameter significantly larger than its thickness, in order to optimize range and minimize the transmit power needed to achieve the desired range.

Figure 2:
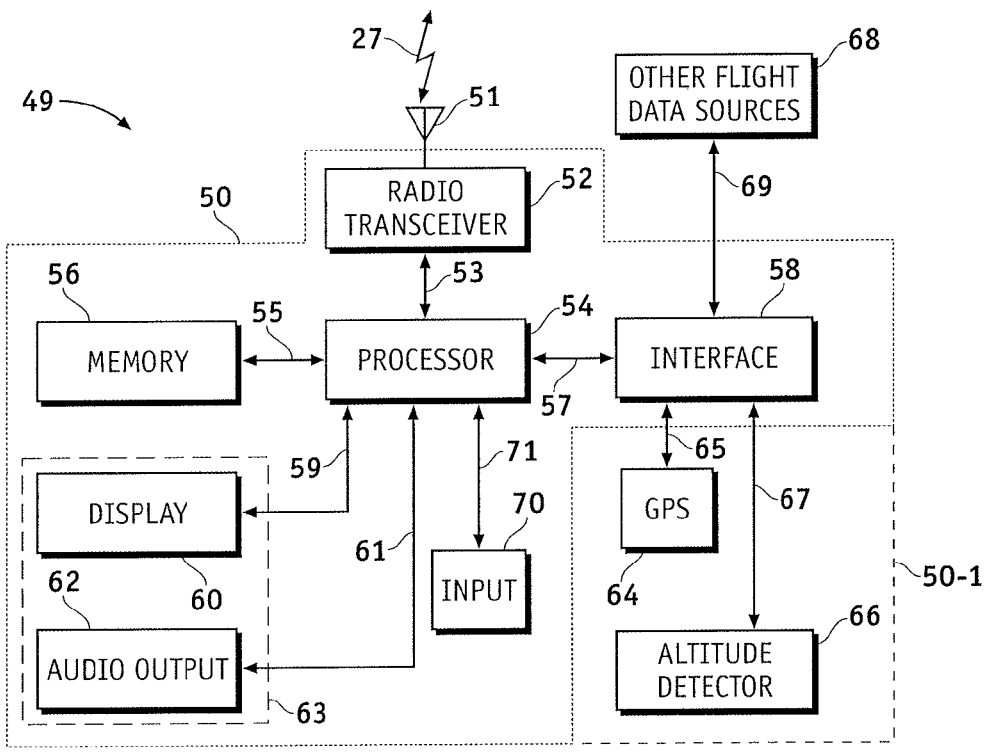
FIG. 2 is a simplified electrical block diagram of an aircraft avionics system including an aircraft traffic warning system according to the present invention.

FIG. 2 is a simplified electrical block diagram of aircraft avionics system 49 including aircraft traffic warning system (TWS) 50 according to the present invention. For convenience, avionics system 49 with TWS 50 is assumed to be mounted at least in aircraft 18, and more preferably also in aircraft 30-36 and 40-46. TWS 50 comprises radio transceiver 52 having antenna 51 for communicating with some or all of aircraft 30-36 via signal 27. Signal 27 is intended to include any or all of signals 20-26 illustrated in FIG. 1. Transceiver 52 conveniently operates under IEEE standard protocol 802.11 or equivalent. The 802.11 protocol has several variations, for example, 802.11b and 802.11 g and others currently being developed. The 802.11 protocol and technical specifications are well known in the art and may be obtained from the Institute of Electrical and Electronics Engineers (IEEE), 345 East 47th Street, New York, N.Y. 10017. Suitable 802.11 transceivers are available from several manufacturers. For example, and not intended to be limiting, type LA-4137-802.11b WLAN transceivers in Compactflash® card form factor, manufactured by Symbol Technologies, Inc., of Holtsville, N.Y. are suitable. (Compactflash® is a registered trademark of the San Disk Corporation.) These transceivers have a digital interface adapted for coupling to a host computer and operate in the unlicensed 2.4 GHz RF band. Symbol Technologies and others manufacture such transceivers in large quantities for use in terrestrial wide local area networks (WLANs). Their power output can be increased to achieve the desired range. For example, with a suitable antenna, an output power of about 1 watt is expected to provide about a ten-mile (sixteen kilometer) range. Use of these and other off-the-shelf components makes it possible to provide a low cost aircraft traffic-warning system suitable for light aircraft.

It is important that each of aircraft 30-36 desired to be tracked have at least the equivalent of transceiver 52 with antenna 51. For conveniences of explanation, these equivalent transceivers and other elements in aircraft 30-36 are identified by using primes, that is, adding an apostrophe mark to the reference number. For example, reference number 52' refers to the equivalent of transceiver 52 but located in aircraft other than aircraft 18. IEEE standard 802.11 transceivers 52, 52' and equivalents have the capability to freely and automatically form ad-hoc local area networks and exchange information. This ad-hoc network mode of operation is described for example in Sections 5.2.1, 5.6 and 11 of the IEEE 802.11 standard. Thus, transceivers 52' located within boundary 48 communicate with and identify themselves to transceiver 52 of aircraft 18, and vice versa. Formation of such ad-hoc networks and exchange of information takes place automatically and does not require particular operator action. Further, such ad-hoc network formation is dynamic, that is, the network forming and/or information transfer signals are automatically repeated so that membership in the ad-hoc network is continually updated. This type of action is particularly well suited to use in a traffic warning system according to the present invention. Further, while use of 802.11 WLAN transceivers is convenient, these are merely examples of suitable transceivers. What is important is that transceivers 52, 52' have the ability to automatically and frequently (e.g., at least about once per second) exchange information on a real time basis in a way that allows the receiving station to deduce relative position information for the transmitting aircraft.

While use of the IEEE 802.11b radios operating in the 2.4 GHz RF band is convenient, this is not intended to be limiting and any suitable radio and frequency band may be used. RF Modems operating at 900 MHz and 2.4 GHz are available and/or supervisory control and data acquisition (SCADA) links at 900 MHz are useful. Other RF bands at 433 MHz can also be used. A frequency band specifically assigned for aircraft traffic warning is desirable but not essential. Licensed or unlicensed radios operating in public lower frequency bands may also be used. Suitable point-to-point digital communication radios are available. The GMRS band allows radios up to 1 watt in the 462-467 MHz band. With these lower frequency bands, care must be taken to have sufficient data communication bandwidth. However, the aircraft location messages of the present invention can be very short. Hence, they can be transmitted at relatively low data rates. For example, at 9600 baud or 19,200 characters per second, approximately fifty stations can take turns sending data without significant data collisions. Thus, the system of the present invention can accommodate relatively large numbers of aircraft within operating boundary 48.

TWS 50 further comprises processor 54 coupled to transceiver 52 by bus or leads 53. Processor 54 is further coupled to memory 56 by leads or bus 55, to optional display 60 by bus or leads 59, to optional audio output 62 by bus or leads 61 and to input 70 by bus or leads 71. While memory 56 is shown separately, persons of skill in the art will understand that this same or additional memory may also be integrated within receiver 52 and/or processor 54. One or the other or both of display 60 and/or audio output 62 are desirable so that TWS 50 can alert the pilot to any potential hazard detected by TWS 50. As used herein, the term "annunciator" identified by reference number 63, is intended to include one or the other or both of display 60 and audio output 62. While annunciator 63 is shown as being part of TWS 50, this is not essential as long as some other means for providing such function(s) exist elsewhere in the aircraft electronics system. Annunciator 63 can alternatively be part of the aircraft's general display and audio output system or be combined with Global Positioning System (GPS) receiver 64. Either arrangement is useful. In the preferred embodiment, but not essentially, interface 58 is provided and coupled to processor 54 by leads or bus 57 so that processor 54 can obtain data from optional Global Positioning System (GPS) receiver 64 coupled to interface 58 by leads or bus 65 and/or from optional altitude detector 66 coupled to interface 58 by leads or bus 67. Optionally, other flight data sources 68 may be coupled to interface 58 by leads or bus 69 and thence to processor 54 via bus or leads 57. Ordinarily, GPS receiver 64, altitude detector 66 and other flight data sources 68 are part of the aircraft's general avionics equipment and need not be provided as a part of TWS 50, but that is not precluded. While use of GPS receiver 64 as a source of position information is preferred, any other source of equivalent information may also be used and the term "GPS" is intended to include such alternative sources of position related information. While GPS receiver 64 and altitude detector 66 are shown in FIG. 2 as being part of the aircraft avionics system rather than being incorporated in TWS 50, this is merely for convenience of description and incorporating them within TWS 50 is also contemplated as indicated by outline 50-1. Separate altitude detector 66 is not essential since GPS receiver 64 can provide three-dimensional position information, including altitude. By combining GPS receiver 64 within TWS 50, the display normally included with most GPS receivers can be eliminated and display 60 used for both functions or visa-versa, that is, the GPS display used in place of display 60. Either arrangement is useful but a fully integrated system is preferred. This makes the overall system more compact and reduces the overall cost. Thus, as used herein, the terms "annunciator" and "annunciator 63" are intended to include the situation where the display function is combined with the GPS display.

Input 70 is desirably but not essentially provided to allow service technicians and/or the user to input various settings and/or programs into processor 54 for storage in memory 56 and/or in transceiver 52 to vary the operating properties of TWS 50. Input 70 can include a conventional keyboard or keypad, a disk or memory module reader, a modem and/or a connection to an aircraft bus. This is desirable to support updating the firmware and/or programs used by processor 54 and transceiver 52 to control operation of TWS 50. It is desirable that memory 56 include non-volatile memory for this purpose.

802.11 compatible radios can operate in a variety of modes. For example, it is possible to use the 802.11 ad-hoc mode by selecting a channel and having transceiver 52, 52' periodically send a location message. When not transmitting, transceiver 52 is actively waiting on the selected channel to receive messages sent by other stations 52'. This approach implements a more specialized mode of the basic ad-hoc capability of transceivers 52 and/or 52'. In this mode, the transceivers send and receive messages at predetermined and/or random intervals rather than first forming a network as part of a WLAN. Since 802.11b transceivers, such as those manufactured by Symbol Technologies noted above, are firmware programmable, this functionality can be easily implemented in software supplied by input 70 or other means. Using this direct send-listen or listen-send mode bypasses the handshake operations normally involved in forming a conventional network as a prelude to exchanging location related information. Either arrangement is useful and as used herein the words "ad-hoc", "ad-hoc network" and "ad-hoc network formation" are intended to have their broadest meaning and to include either or both implementations, that is, listen-talk, talk-listen and dynamic network formation.

Figure 3:
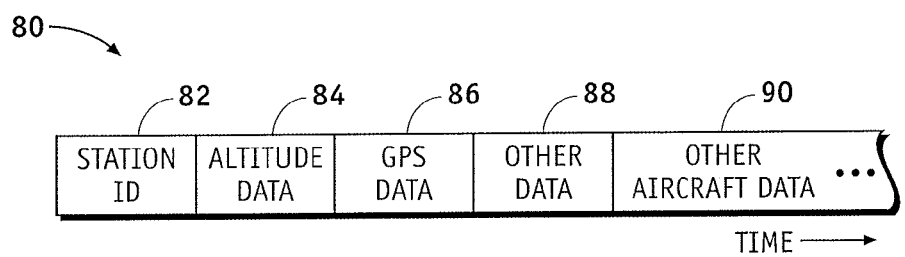
FIG. 3 is a simplified diagram illustrating a data stream being exchanged between aircraft according to the traffic warning system of the present invention.

FIG. 3 is a simplified time diagram illustrating data stream 80 being sent by aircraft 30-36 to aircraft 18 or being exchanged between aircraft 30-36 and aircraft 18 in signal 27, that is, from or to those aircraft 30-36 that have formed an ad-hoc network or are otherwise communicating with aircraft 18 according to the 802.11 protocol or other digital signaling mode. Each aircraft 30-36 is assumed to contain transceiver 52' equivalent to transceiver 52 in aircraft 18, sending or exchanging signals 27. Each aircraft 30-36, 40-46 has its own boundary 48' analogous to boundary 48 of aircraft 18, as shown for example by boundary 48' associated with aircraft 36 in FIG. 1. Not all segments 82-90 of data stream 80 of signal 27 are essential, nor need they be transmitted in the sequence shown, although this is preferred. Each data stream 80 contains at least unique identification (ID) data segment 82, so that TWS 50 of aircraft 18 can identify the individual aircraft or stations within boundary 48. In a first mode of operation, TWS 50 of aircraft 18 receives signals 27 from transceivers 52' and measures the signal strength (a capability included in most 802.11 type transceivers). This signal strength information is passed over bus or leads 53 to processor 54, and when appropriate stored in memory 56 along with the station ID. The signal strength gives a rough measure of the distance between each of aircraft 30-36 and aircraft 18. By tracking the signal strength of each aircraft 30-36 as a function of time, processor 54 can determine when any of aircraft 30-36 has approached or is likely to approach within a potentially hazardous range of aircraft 18 and provide a warning message to the pilot or other crew member via annunciator 63. Stated another way, the signal strength allows TWS 50 to determine that each of aircraft 30-36 lies approximately on a sphere (or equivalent contour) of a particular radius from aircraft 18. As aircraft 30-36 repeat their ID signals (data segments 82), a new signal strength and resulting radius are determined for each of aircraft 30-36. The time rate of change of the radii gives information on the how rapidly the other aircraft is approaching or receding from a predetermined alarm radius about aircraft 18. The predetermined alarm radius is the radius where another aircraft should be identified as a potential threat. Persons of skill in the art will understand how to choose alarm radii for different types of aircraft. Processor 54 can make a forward prediction based on the historical rate and direction (increasing/decreasing) of change in radii and can alert the pilot through annunciator 63 with, for example, a first warning denoting a rapidly approaching aircraft and a second warning when it has reached the predetermined alarm radius or is within a guard band of such alarm radius. Among other things, TWS 50 can determine both absolute separation distance (e.g., radius) and. using data stored in memory 56 from previous range measurements, determine the rate of change of separation distance. Depending upon the data received from the other aircraft (e.g., data segments 84, 86, etc.), TWS 50 also determine other flight parameters of the aircraft in its vicinity (e.g., speed, direction, course, altitude), as well as the rate of change of these parameters.

In another mode of operation wherein aircraft 30-36 also have available altitude data and/or GPS position data, then data stream 80 received by TWS 50 of aircraft 18 includes one or both of data segments 84 (altitude data) and 86 (GPS data). This altitude and/or 2-D or 3-D GPS position information is passed from transceiver 52 to processor 54 of TWS 50, wherein processor 54 in cooperation with memory 56, can determine the altitude of the transmitting aircraft from data segment 84 and/or the 2-D or 3-D location of the transmitting aircraft from GPS position data segment 86. GPS position data 86 allows TWS 50 to determine a much more precise range to the other aircraft than is possible merely with signal strength alone. Further, the relative bearing of the other aircraft can also be computed knowing the GPS position of both the other aircraft and aircraft 18. (The position of aircraft 18 is known from its own GPS receiver 64.) By tracking successive position reports in updated data segments 86, processor 54 can also determine the speed and direction vector of the other aircraft. As used herein, the terms "GPS" and "GPS data" are intended to refer to absolute or relative position data in two and/or three dimensions obtained from any source and are not intended to be limited merely to data obtained from the Global Positioning System.

If only the signal strength and altitude information is available (e.g., from data segments 82, 84), the approaching aircraft can be determined to lie on the rim of a cone with aircraft 18 at its apex and slant height equal to the signal strength range. Processor 54 uses some or all of this altitude, position, direction and/or speed information to refine its estimate of the likelihood that the other aircraft represents a potential hazard to aircraft 18 and notifies the pilot or other crewmember accordingly using annunciator 63. Because the availability of altitude, position and other data increases the accuracy with which TWS 50 can track the aircraft within boundary 48, the inclusion of data segments 84, 86 is preferred. Thus, as more and more aircraft become equipped with TWS 50 of the present invention the traffic warning accuracy improves.

In a still further embodiment, data stream 80 may include data segment 88 containing other useful flight related information if available within some or all of aircraft 30-36. Non-limiting examples of such other useful information are velocity, heading, rate of climb or descent, and so forth. Even with such information included, data stream 80 is still relatively short, for example, on the order of 100 to 200 bits or less. Thus, transmit time for each aircraft 18, 30-36 is very short and they can share the same channel and still provide a data repetition rate for each aircraft sufficient to allow aircraft 18 to maintain a current picture of the other aircraft 30-36 in its vicinity. Data collisions can be minimized by, for example, programming transceivers 52' to transmit at random intervals or with random delays after receiving an interrogation signal from transceiver 52. Other well-known methods for avoiding significant data collisions can also be used.

Optional data segment 90 can also be included in data stream 80. While data segments 82-88 provide information about the flight parameters of the transmitting aircraft (e.g., one of aircraft 30-36), data segment 90 includes information about the flight parameters of other aircraft that are within boundary 48' of the transmitting aircraft; for example, their altitude, position, range, heading, etc., that is, some or all of data segments 82-88 for other aircraft that the transmitting station has already detected and identified. By including this type of information, aircraft 18 can have information about aircraft that are outside of its own transmit/receive boundary 48. In this mode of operation, each aircraft is accumulating information about the aircraft in its vicinity (i.e., within its own boundary 48') and shares this information with those aircraft within range of its transceiver 52'. Thus, in addition to receiving data segments 82-88 for the transmitting aircraft 30-36, aircraft 18 but can also receive via the transmitting aircraft, equivalent information about other aircraft that are able to communicate with the transmitting aircraft, but not communicate directly with aircraft 18. Thus, inclusion of data segments 90 provides indirection communication of flight parameters for aircraft outside boundary 48 to TWS 50 of aircraft 18.

For example, referring to FIG. 1, boundary 48' of aircraft 36 includes aircraft 40, 46 in addition to those aircraft (30, 35, 36) it shares with boundary 48 of aircraft 18. In this way, aircraft 18 can track a larger group of aircraft in its vicinity and thereby be able to provide its pilot with more advanced warning of potential developing hazards. It is convenient that periodic interrogation signals transmitted by TWS 50 of aircraft 18 to other aircraft within boundary 48 normally include a first code telling such aircraft to "send me your own flight data", e.g., your own segments 82-88, and from time to time (generally at longer intervals than signals containing the first code) include a second code telling aircraft 30-36 to "send me equivalent data you have obtained on aircraft in your vicinity." This allows aircraft 18 to keep general track of aircraft within a larger space. Since these aircraft are further away, their data can be requested less frequently than data from aircraft within boundary 48. This reduces communication clutter and data collisions.

Figure 4:
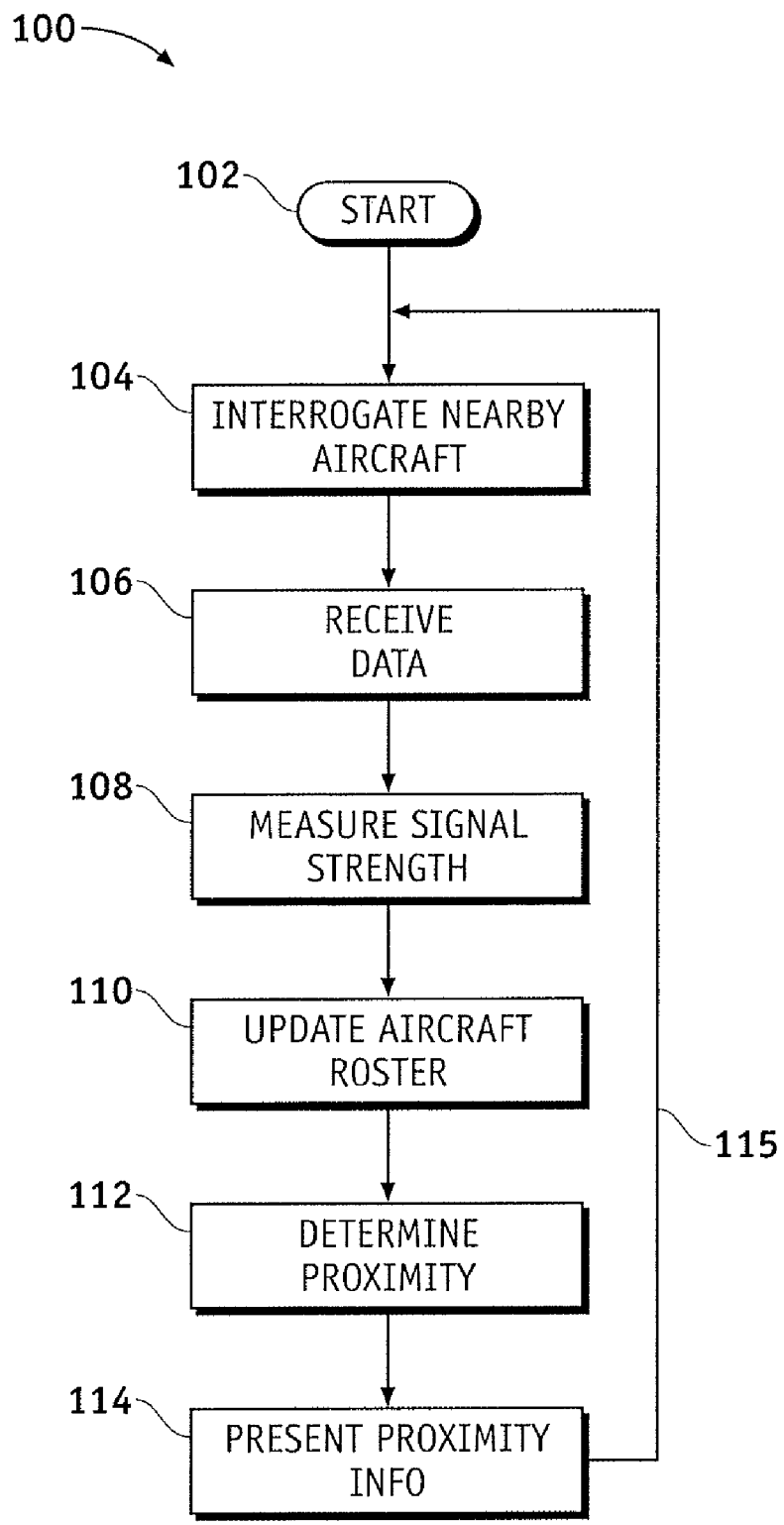
FIG. 4 is a simplified flow chart of a traffic warning method according to a first embodiment of the present invention.

FIG. 4 is a simplified flow chart of a traffic warning method 100 according to a first embodiment of the present invention. Method 100 begins with START 102, which usefully occurs when the aircraft avionics system (including TWS 50) is powered up. In INTERROGATE NEARBY AIRCRAFT step 104, TWS system 50 communicates with those aircraft within boundary 48 by, for example, either: (a) listening for transceivers 52' of such aircraft to send some or all of data stream 80, or (b) sending an interrogation signal from transceiver 52 to transceivers 52' within boundary 48, inviting them to respond with some or all of data stream 80. This may be done with or without forming a network with aircraft 30-36. In either case, in RECEIVE DATA step 106, TWS 50 receives at least their unique IDs (data segment 82) plus whatever other flight data (e.g., segments 84, 86 or 88) that the aircraft within boundary 48 are capable of providing. MEASURE SIGNAL STRENGTH step 108 step is then performed wherein the strength of the received signals associated with each unique ID is measured by transceiver 52 and communicated from transceiver 52 to processor 54. UP-DATE AIRCRAFT ROSTER step 110 is then performed wherein the list of previously received aircraft IDs and flight parameters stored in memory 56 is updated, adding those aircraft that have entered boundary 48 and dropping those that have exited. DETERMINE PROXIMITY step 112 is performed, e.g., by processor 54, wherein the received signal strength data from transceiver 52 is used to calculate an approximate range to the transmitting station. PRESENT PROXIMITY INFORMATION step 114 is then desirably executed via annunciator 63 according to operating protocols stored, for example in memory 56. By way of example and not intended to be limiting, annunciator 63 may present some (e.g., only the closest aircraft) or all of the available proximity information as for example by showing concentric rings of different radii on display 60 to represent the location spheres on which the transmitting planes lie, with for example, those within a minimum defined "potential hazard" or "alarm" radius flashing in a different color, or it may announce audibly via audio output 62 that one or more aircraft are within the predetermined minimum "potential hazard" or "alarm" distance. Any combination of such alerts can be used. The more information that has been received concerning the flight parameters of the other aircraft, the greater the precision of the information that can be presented to the pilot. As shown by path 115 following step 114, method 100 cycles back to START 102 and initial steps 104, 106 wherein TWS 50 receives or requests and receives updated information from those aircraft within boundary 48 and steps 104-114 are repeated. In this way, the ad-hoc network or group of planes being tracked is reformed to reflect any changes in aircraft status (e.g., position, speed, altitude, direction, location in/out of boundary 48, etc.) that may have occurred in the interim. Method 100 repeats steps 104, 106, 108, 110, 112, 114 as long as there are other aircraft within boundary 48. While loop-back path 113 is shown as occurring after presentation step 114, persons of skill in the art will understand that loop-back can occur after steps 110 or 112 in parallel with presentation step 114. In this way, information update is not delayed by the time needed to present the information to the pilot.

Figure 5:
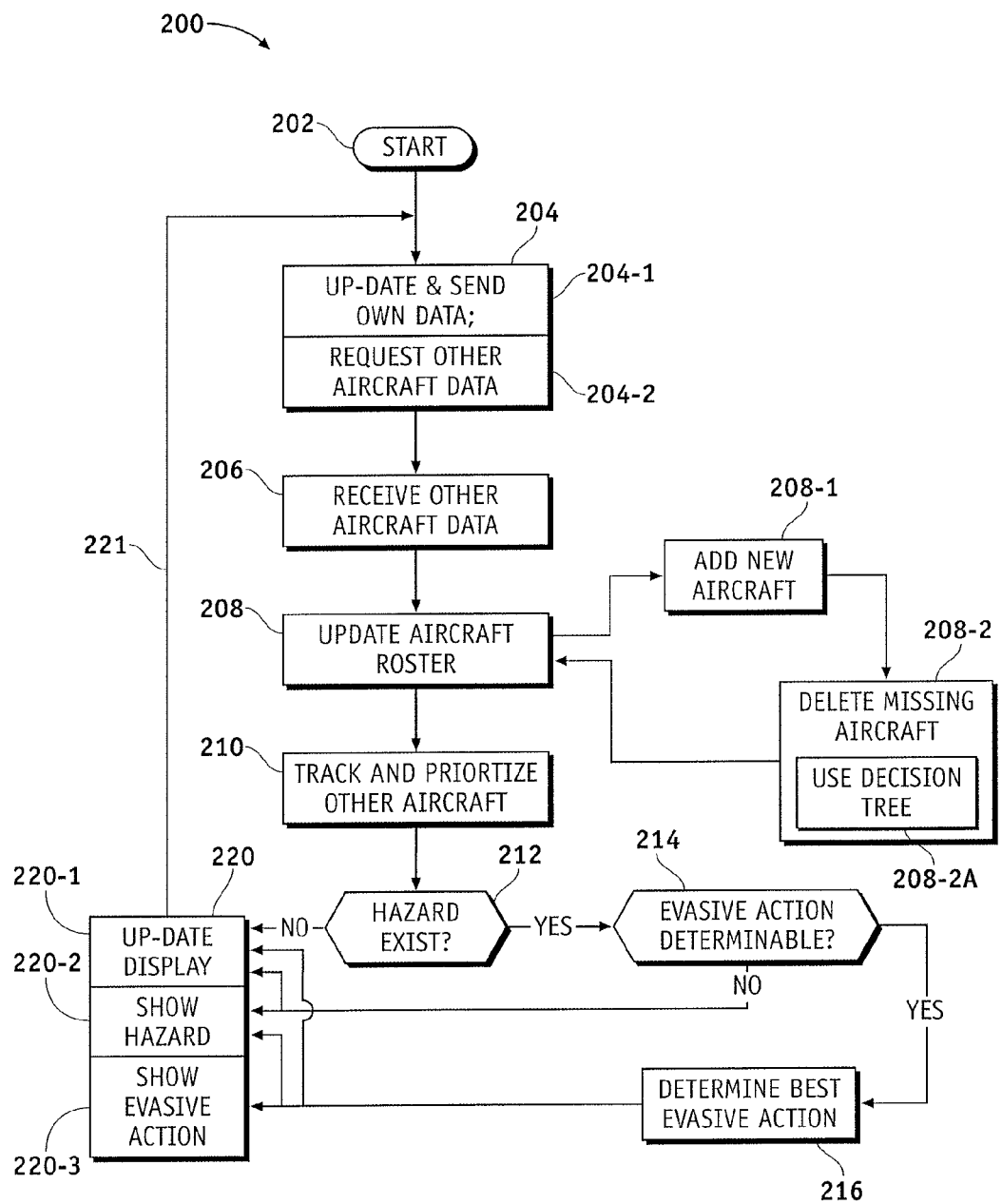
FIG. 5 is a simplified flow chart of a traffic warning method according to a further embodiment of the present invention.

FIG. 5 is a simplified flow chart of traffic warning method 200 according to a further embodiment of the present invention. Method 200 begins with START 202 that desirably occurs on avionics start-up. Initial step 204 is analogous to step 104. Step 204 desirably comprises sub-steps 204-1 and 204-2. In sub-step 204-1, TWS 50 of aircraft 18 up-dates its own flight data (e.g., from GPS 64, altitude detector 66, other flight data sources 68 and processor 54) and sends this information to aircraft 30-36 and in sub-step 204-2 it requests equivalent information from aircraft 30-36. Sub-steps 204-1 and 204-2 are generally combined in the same message or signal 27. In this embodiment, it is assumed that the other aircraft within boundary 48 have TWSs 50' analogous to TWS 50 of aircraft 18. TWSs 50' respond with their corresponding data streams 80' analogous to data stream 80 containing at least their IDs and some or all of their altitude data, position data, etc. This information is received by TWS 50 in step 206. This data is passed from transceiver 52 to processor 54, which in cooperation with memory 56 executes UPDATE AIRCRAFT ROSTER step 208 analogous to step 110 of FIG. 4. TRACK AND PRIORITIZE OTHER STATIONS step 210 is then executed in which at least the range of the other aircraft within boundary 48 is determined. Depending upon the completeness of systems 50' on the reporting aircraft, TWS 50 on aircraft 18 may also receive speed and direction information. Alternatively, by tracking the range, altitude and/or position change between successive reporting intervals, the speed and direction of the other aircraft may be determined by processor 54. The closest aircraft approaching at the highest speed on a converging course are generally assigned a higher priority. HAZARD EXIST ? query 212 is then executed wherein it is determined by comparing the received and/or computed range, speed course, and other information with predetermined alarm thresholds whether or not a hazardous or potentially hazardous condition exists. If the outcome of query 212 is NO (FALSE), then method 200 advances to UP-DATE DISPLAY step 220, sub-step 220-1, wherein the newly determined position and flight path information is presented to the pilot via annunciator 63. Method 200 then returns to START 202 and initial steps 204 as shown by path 221.

If the outcome of query 212 is YES (TRUE), indicating that one or more of the nearby aircraft have intersected or are about to intersect an alarm condition, then method 200 advances to EVASIVE ACTION DETERMINEABLE ? query 214 wherein it is determined whether or not enough information is available for processor 54 to calculate a possible evasive action to avoid the hazard or approaching hazard. For example, if only the aircraft ID and approximate range is available (e.g., from the signal strength), then it is unlikely that processor 54 can compute an evasive action since the direction of the perceived threat is unknown to processor 54. Thus, if the outcome of query 214 is NO (FALSE) then method 200 advances to SHOW HAZARD step 220, sub-step 220-2, wherein the available information is presented to the user and the display updated in sub-step 220-1, after which method 200 proceeds via path 221 back to START 202 and initial step 204. If the outcome of query 214 is YES (TRUE) indicating that sufficient altitude, position, course, speed, etc., information exists to permit processor 54 to evaluate possible evasive actions, then DETERMINE BEST EVASIVE ACTION step 216 is executed and the results presented to the pilot in SHOW EVASIVE ACTION step 220, sub-step 220-3 along with the hazard in sub-step 220-2 and up-dated position information in sub-step 220-1. Method 200 then loops back to START 202 and initial step 203 as shown by path 221.

Sub-steps 208-1 and 208-2 illustrate further details of UPDATE AIRCRAFT ROSTER step 208. In addition to up-dating the aircraft flight parameters previously stored in memory 56 any new aircraft detected by TWS 50 during the latest iteration of step 206 are added to the stored information in sub-step 208-1 and any previously remembered aircraft that where not present in the last update or the last N updates of step 206 are pruned in step 208-2 from the aircraft roster stored in memory 56, where N can be 1, 2, 3 . . . , with the value of N depending on the channel noise and transmission repeat rate being used. As indicated by USE DECISION TREE sub-step 208-2A, the pruning operation can be dynamically varied. For example, as the number of aircraft being tracked increases, the probability of data collisions also increases. Such data collisions might cause a particular aircraft's signal to be missed when the aircraft array is polled in steps 204-206. Under these circumstances, it is desirable that $N \leq 1$, conveniently $1 \leq N \leq 20$, more conveniently about $5 \leq N \leq 15$ and preferable about N=10. For example, a value of N=10 corresponds to about a 10 second time interval, that is, the particular aircraft would not be dropped from the roster until it had failed to report for that interval. Further, the value of N being used can be varied according to the relative location of the transmitting aircraft. For example, if the last known position of the transmitting aircraft was within a predetermined distance near boundary 48, then using N=1 or 2 (i.e., dropped on the first or second miss) is appropriate. In general, it is desirable that the larger the radius R to the transmitting aircraft, the lower the probability that the aircraft will create a hazard and therefore the lower the value of N that is used in deciding how many misses before the aircraft is presumed to have left boundary 48 and is dropped from the roster of aircraft being tracked. Analogous criteria can be adopted dependant on the speed, course and altitude of the aircraft, since these help determine the risk associated with prematurely dropping an aircraft from the roster of those being tracked by TWS 50. In any case, USE DECISION TREE sub-step 802-2A provides adaptive decision making for deleting missing aircraft, that is, those from whom no up-date signal was received in N iterations. While using the refresh iteration count N as the measuring parameter is convenient, it is not intended to be limiting, and other criteria, as for example, time can also be used. When an aircraft is flying on a nearly parallel course at a similar speed and at a range approximating that of boundary 48, it may continually appear to enter and leave boundary 48 such that it would be repeatedly added to and dropped from the roster of aircraft being tracked. In such situation, decision tree 208-2A can also include a software filter to retain such aircraft within the roster until it has failed to report a larger number of times. This avoids unnecessary changes in the roster of aircraft being tracked. Method 200 repeats steps 204-220 as long as there are other aircraft within boundary 48. While loop-back path 221 is shown as occurring after presentation up-date step 220, persons of skill in the art will understand that loop-back can occur after step 210 in parallel with steps 212-220. In this way, input information update is not delayed by the time needed to determine whether a hazard exists and present the information to the pilot.

Figure 6:
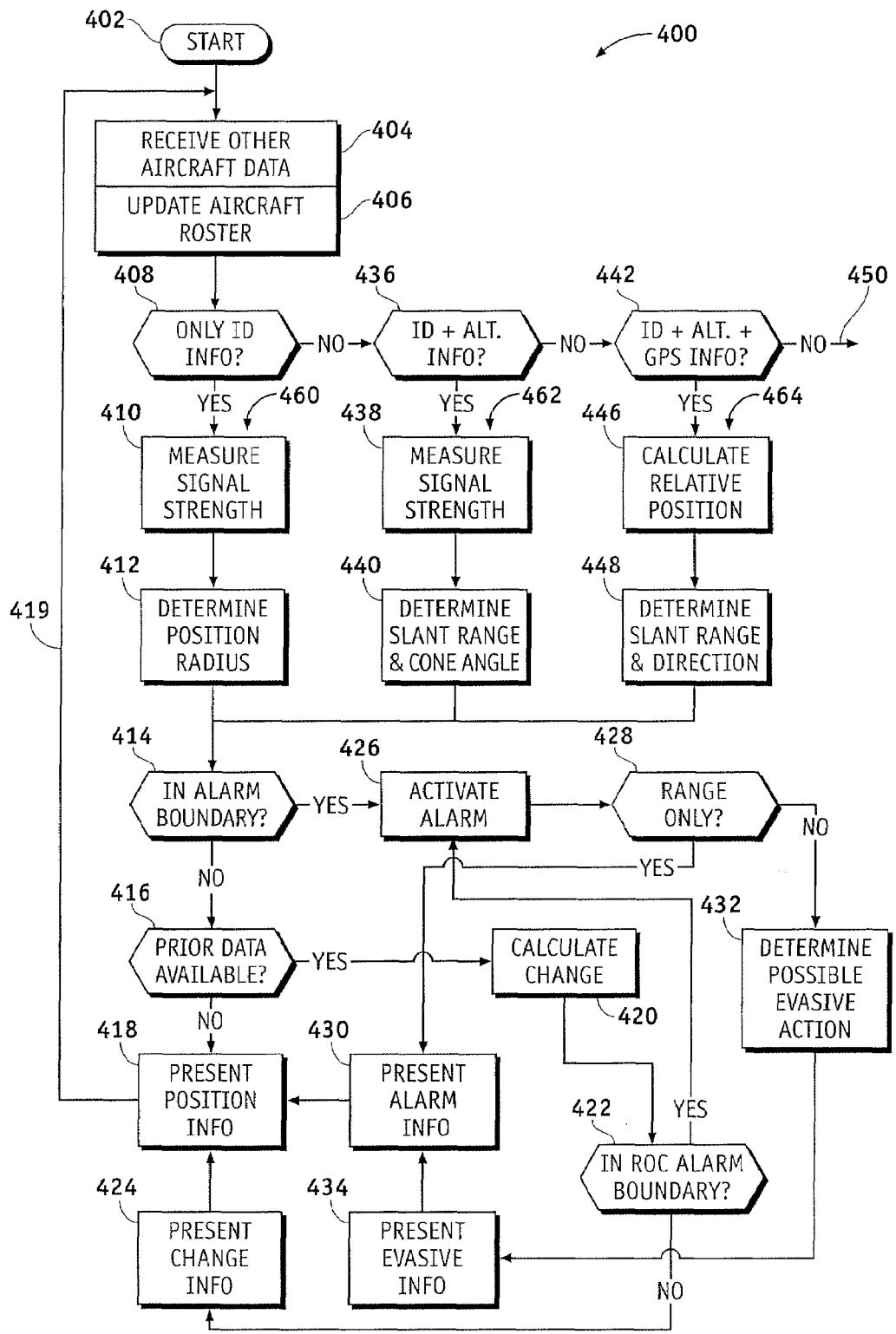
FIG. 6 is a simplified flow chart of a traffic warning method according to a still further embodiment of the present invention and showing greater detail.

FIG. 6 is a simplified flow chart of traffic warning method 400 according to a still further embodiment of the present invention and showing further detail. Method 400 begins with START 402 that desirably occurs on avionics start-up. In method 400, it is assumed that an ad-hoc network has already been formed and/or that the TWS transceivers 50, 50' of aircraft 18, 30-36 are routinely broadcasting or exchanging data signals, so that in initial step 404, aircraft 18 receives at least aircraft ID and preferably other position related data from the other aircraft within boundary 48. In step 406, this information is used to update the roster of aircraft being tracked as has already been discussed in connection with FIGS. 4-5. Following receipt of data stream 80, three paths are illustrated in FIG. 6, depending upon how many of data segments 82-88 are populated in the signal received from the other aircraft. Path 460 flowing from query 408 is based on receiving only data segment 82, path 462 flowing from query 436 is based on receiving only data segments 82, 84, and path 464 flowing from query 442 is based on receiving data segments 82, 84, 86. Arrow 450 flowing from query 442, indicates that further flight data information contained in data segments 88 and beyond are taken into account by additional path(s) with steps analogous to the steps of path 464, utilizing the addition data.

Following receipt of data stream 80 in step 404 and updating the aircraft roster in step 406, path 460 flowing from ONLY ID INFO ? query 408 is executed. In step 408 it is determined whether the received data contains only station ID information (data segment 82). If the outcome of query 408 is YES (TRUE), then in step 410 the incoming signal strength is measured by transceiver 52 and in step 412, processor 54 uses this information to determine an approximate range to the transmitting station, that is the radius of its position relative to aircraft 18. Steps 414-434 apply to all pathways 460, 462, 464 although the results differ depending upon how much input data is available, e.g., data segments 82 (path 460), data segments 82, 84 (path 462) and data segments 82, 84, 86 (path 464). The discussion of steps 414-434 that follows is general in that it recognizes that some of the paths have more data available than others. The difference in outcomes depending upon which path is being followed is noted.

IN ALARM BOUNDARY ? query 414 is executed to determine whether the radius or range determined in step 412 (or range and angle determined in step 440 or range and direction determined in step 448) is within a predetermined minimum range (or altitude, direction, etc.) wherein the other aircraft should be considered a potential hazard to aircraft 18. If the outcome of query 414 is NO (FALSE), then method 400 advances to PRIOR DATA AVAILABLE ? query 416 in which it is determined whether or not the particular aircraft whose ID has been received has previously transmitted within a predetermined latency interval, as for example, the maximum interval during which repeated signal transmissions from the same source are expected to be received. Persons of skill in the art will understand based on the description herein how to select the latency interval depending upon the expected re-transmission rate for the type of aircraft intended to be monitored. If the outcome of query 416 is NO (FALSE), then method 400 proceeds to step 418 wherein the position information determined in step 412, 440 or 448 is presented to the pilot via annunciator 63 and method 400 returns to START 402 and initial steps 404, 406 as shown by loop-back path 419.

If the outcome of query 416 is YES (TRUE), then method 400 proceeds to CALCULATE CHANGE step 420 wherein the change in range (and/or other parameters) is determined from prior data stored in memory 56 for the same aircraft. Following step 420, method 400 advances to optional IN ROC ALARM BOUNDARY ? query 422 in which it is determined whether or not the rate of change (ROC) of range and/or other parameters lies within a predetermined alarm boundary where a hazardous situation might be developing based on the rate of change of range and/or other parameters rather than on mere range and/or the parameters values per se. If the outcome of query 422 is NO (FALSE) then method 400 proceeds to PRESENT CHANGE INFO step 424 wherein this information is presented to the pilot or crew along with position info in step 418. Method 400 then flows back to start 402 and initial steps 404, 406 as shown by path 419. For example, if the rate of change (ROC) of position determined in step 420 based on signal strength data or GPS data is very rapid and the aircraft direction determined from GPS data in step 448 is towards aircraft 18 or the cone angle determined in step 440 from the range and altitude is decreasing rapidly, then this is an indication that a potentially hazardous situation may be developing and a ROC alarm should be given even though the aircraft is still far enough away that an absolute range (distance) or altitude alarm boundary has not yet been crossed.

Returning now to queries 414 (IN ALARM BOUNDARY ?) and 422 (IN ROC ALARM BOUNDARY ?), if the outcome of either of queries 414 or 422 is YES (TRUE), then method 400 proceeds to ACTIVATE ALARM step 426 following by RANGE ONLY ? query 428 wherein it is determined whether or not the input data is limited to range only, e.g., from path 460. If the outcome of query 428 is YES (TRUE) then method 400 proceeds to PRESENT ALARM INFO step 430 and PRESENT POSITION INFO step 418 wherein the alarm condition and available position information is presented to the pilot by annunciator 63. If the outcome of query 428 is NO (FALSE), indicating that other information (e.g., some or all of altitude, position, speed, course, etc.) is available, then method 400 proceeds to step 432 wherein possible evasive action is determined, as has been previously described and onto PRESENT EVASIVE INFO step 434 wherein the evasive action information, alarm information (step 430) and position information (step 418) are presented to the pilot and/or crew, and then method 400 returns to START 402 and initial steps 404, 406 as shown by path 419. With only range information available (e.g., path 460) the potentially hazardous aircraft can be anywhere on a sphere of the determined radius surrounding aircraft 18 and it is generally not possible to suggest a particular evasive action. Hence, in these circumstances PRESENT ALARM INFO step 430 uses annunciator 63 to warn the pilot about the potential hazard situation and, optionally, that it has no evasive action to suggest. Where additional information is available (paths 462, 464) then processor 54 can generally compute a possible evasive action. Thus path 460 differs in outcome from paths 462, 464 in that step 432 is not executed in path 460 and therefore no projected evasive action is available in path 460, whereas step 432 in paths 463, 464 does generally provide a recommended evasive action. The outcome of presentation steps 418, 424, 430, 434 also differ among paths 460, 462, 464 because the more input information that is available to TWS 50, the more detailed the information that can be presented to the pilot on the range, altitude, speed and course of aircraft 30-36 being directly tracked, and those of aircraft 40-46 that can be indirectly tracked, as previously explained, and about the potential or actual alarm conditions and possible evasive actions.

Returning now to query 408, if the outcome of query 408 is NO (FALSE) meaning that other information besides ID data is contained in data stream 80 received from the other aircraft, then method 400 proceeds to ID+ALTITUDE INFO ? query 436 is which it is determined whether or not the other information contained in data stream 80 consists of altitude information. If the outcome of query 436 is YES (TRUE) indicating that data stream 80 has only data segments 82, 84, then method 400 proceeds to measuring step 438 analogous to measuring step 410. Processor 54 then executes step 440 in which the altitude is combined with the range information deduced from the signal strength to determine the slant range and cone angle for the transmitting aircraft. As noted earlier, if range and altitude of the other aircraft are known relative to aircraft 18, then the transmitting aircraft can be placed on the rim of a cone whose apex is located on aircraft 18 and whose slant range and cone angle can be determined by simple geometry. Path 462 of method 400 then advances to IN ALARM BOUNDARY ? query 414 already discussed. The foregoing discussion of steps 414-434 is incorporated herein by reference. However, with both range and angle information in path 462, it is generally possible for processor 54 to compute a possible evasive action. The potentially threatening aircraft lies on the rim of a cone whose plane is at a known elevation relative to aircraft 18, whose apex is centered on aircraft 18, and whose slant range is determinable from the signal strength. For example, in presentation steps 418, 430 the rim of the cone can be represented on display 60, for example, as a line having a particular altitude and a length determined by the diameter of the rim of the cone, thereby giving the pilot a visual picture of the potential locations of the other aircraft. The transmitting aircraft can be ahead, behind or to the side of aircraft 18. Processor 54 can generally compute a possible evasive action to be presented in step 434.

Returning now to query 436, if the outcome of query 436 is NO (FALSE) meaning that other information (i.e., GPS data) besides ID and altitude data is contained in data stream 80 received from the other aircraft, then method 400 proceeds to ID+ALT+GPS INFO ? query 442 is which it is determined whether or not the other information contained in data stream 80 consists of position information. If the outcome of query 448 is YES (TRUE) indicating that data stream 80 has data segments 82, 84, 86 then method 400 proceeds to path 464 and CALCULATE RELATIVE POSITION step 446 and DETERMINE SLANT RANGE AND DIRECTION step 448 where the 3-D position of the other aircraft is calculated relative to aircraft 18. When the GPS positions or equivalent of both aircraft are known, the range and angle of the other aircraft relative to the position and course vector of aircraft 18 can be determined by geometry. Path 464 then proceeds to IN ALARM BOUNDARY ? query 414 and subsequent steps already discussed, which discussion is incorporated herein by reference. Because much greater aircraft flight data is available, much more precise position, course, speed, altitude and other information can be provided to the pilot. For example, in presentation step 418, the aircraft being monitored can be represented as a point in a 3-D display or a pair of orthogonal 2-D displays. The relative position of the transmitting aircraft is known with a precision determined by the GPS receivers.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for tracking aircraft using an airborne traffic warning system (TWS) having inter-coupled transceiver, processor, memory, annunciator and flight status instruments, comprising:

receiving repetitively ID and positional information signals from aircraft within communication range;

updating using the received signals, a roster of aircraft whose IDs and positional information are retained in memory from the previous receiving step, including adding aircraft whose ID's are not already stored in the roster and dropping aircraft whose ID's were not included in the last N repetitions of the receiving step, where N>1;

determining proximity of each of the aircraft from the received signals; and presenting the proximity information to the user via the annunciator.

2. The method of claim 1, further comprising prior to the receiving step:

sending an interrogation signal to the aircraft asking that they report their ID and positional information.

3. The method of claim 1, wherein the determining step comprises:

determining the proximity of each of the aircraft from the positional information in the received signals.

4. The method of claim 1, wherein the determining step comprises:

determining the proximity of each of the aircraft from the strength of the received signals.

5. The method of claim 2, wherein the sending step further comprises:

including in the interrogation signal information on the position of the aircraft sending the interrogation signal.

6. The method of claim 1, wherein 20>N>1.

7. The method of claim 1, wherein N is determined at least in part by a last stored proximity value for that aircraft.

8. The method of claim 3, further comprising after the determining step:

comparing the positional information with one or more stored positional alarm conditions; and advising the user via the annunciator when the positional information violates any of the one or more stored positional alarm condition.

9. The method of claim 8, further comprising after the comparing step:

determining a possible evasive action to avoid or relieve the violation of the one or more stored positional alarm conditions.

10. The method of claim 8, further comprising after the comparing step:

determining first whether or not sufficient positional information is available to determine evasive action; and if not, then proceeding to the advising step; and if so, then determining second a possible evasive action to avoid or relieve the violation of the one or more stored positional alarm conditions; and presenting a recommended evasive action to the user.

11. A method for tracking aircraft using an airborne traffic warning system (TWS) having inter-coupled transceiver, processor, memory, annunciator and flight status instruments, comprising:

receiving ID and positional information signals from aircraft within communication range;

updating using the received signals, a roster of aircraft whose IDs and positional information are retained in memory from the previous receiving step;

determining proximity of each of the aircraft from the positional information in the received signals;

presenting the proximity information to the user via the annunciator;

comparing the positional information with one or more stored positional alarm conditions;

determining whether sufficient positional information is available to determine evasive action; and if there is sufficient positional information, determining a possible evasive action to avoid or relieve the violation of the one or more stored positional alarm conditions; and presenting a recommended evasive action to the user;

if there is not sufficient positional information, advising the user via the annunciator when the positional information violates any of the one or more stored positional alarm condition.

* * * * *